United States Patent

Kwan et al.

[11] Patent Number: 5,910,827
[45] Date of Patent: Jun. 8, 1999

[54] VIDEO SIGNAL DECODING ARRANGEMENT AND METHOD FOR IMPROVED ERROR CONCEALMENT

[76] Inventors: Katherine W. Kwan, 1072 Wilmington Ave., San Jose, Calif. 95129; Paul A. Voois, 1063 Morse Ave., Sunnyvale, Calif. 94089

[21] Appl. No.: 08/806,312

[22] Filed: Feb. 26, 1997

[51] Int. Cl.$^6$ .............................. G06F 11/00; H04N 7/68
[52] U.S. Cl. ........................................ 348/845.1; 371/31
[58] Field of Search .................... 348/845.1, 15, 348/607, 616, 624; 371/31

[56] References Cited

U.S. PATENT DOCUMENTS

| | | | |
|---|---|---|---|
| 5,287,185 | 2/1994 | Cho | 348/624 |
| 5,339,321 | 8/1994 | Paek | 348/624 |
| 5,455,629 | 10/1995 | Sun | 348/426 |
| 5,534,937 | 7/1996 | Zhu | 348/845.1 |
| 5,793,432 | 8/1998 | Mishima | 348/845.1 |

OTHER PUBLICATIONS

"The AC-3 Multichannel Coder", by Mark F. Davis, Dolby Laboratories Inc., http://www.dolby.com/tech/ac-3mult.html, last updated Apr. 14, 1997, pp. 1–6.

"ITU-T Draft H.263", International Telecommunicatoins Union, http://www.fou.telenor.no/brukere/DVC/h263_wht, dated May 28, 1997, pp. 1–44.

"H.261 Video Coding", http://rice.ecs.soton.ac.uk/peter/h261/h261.html, dated May 28, 1997, pp. 1–3.

"CCITT Reg. H.261—Standard Text", http://icib.igd.fhg.de/icib/telecom/ccitt/rec_h.261–1990/read.html, dated May 28, 1997, pp. 1–25.

"What's H.261/H.263?", Graphics Communication Laboratories, http://www.gctech.co.jp/software/h26x.shtml, dated May 28, 1997, pp. 1–2.

"Summary of ITU-T Recommendation H.263", http://info.itu.ch/itudoc/itu–t/rec/h/s_h263_e_41913.html, dated May 28, 1997, p. 1.

*Primary Examiner*—Howard Britton

[57] ABSTRACT

A video signal decoding arrangement conceals visible artifacts attributable to errors in a data stream. The arrangement includes a data processing arrangement that decodes the data stream into image data and that replaces data corrupted by the errors with replacement data generated as a function of a previous frame. The image data is optionally stored in first and second memories.

39 Claims, 6 Drawing Sheets

VIDEO SIGNAL DECODING ARRANGEMENT AND METHOD FOR IMPROVED ERROR CONCEALMENT

FIELD OF THE INVENTION

The present invention relates to video signal transmission systems. More particularly, the present invention relates to an arrangement and method for concealing errors occurring during the transmission of a video signal data stream.

BACKGROUND OF THE INVENTION

In some types of image transmission applications, such as videoconferencing applications, a video camera captures a series of video frames of a target. The series of video frames is typically encoded as a data stream at one location and sent over a communications channel to another location. For example, the data stream may be transmitted over a phone line, an integrated services digital network (ISDN) line, or the Internet. In certain other image transmission applications, the encoded data stream is sent from one component, such as a CD-ROM drive, of a system to another component, for example, a central processing unit (CPU), of the same system.

An encoder at the sending location typically divides the frames into a number of data packets, such as macroblocks or groups of blocks (GOBs). Certain patterns are typically repeated in the data stream, resulting in various conditions collectively known as redundancy. For example, spatial redundancy occurs when a pattern appears at several locations in a data packet. Another type of redundancy, known as temporal redundancy, occurs when a pattern appears in a group of related frames. Some patterns exhibit both spatial and temporal redundancy.

The encoder typically compresses the data packets according to a video compression standard, such as the ITU-T H.261 or H.263 standard, by reducing redundancy within the data. For example, some compression techniques, known collectively as interframe compression, reduce spatial and temporal redundancy across a series of related frames and encodes series of frames as data packets known as interframes. Interframe compression encodes data packets of this type as a function of a previous frame and on difference information representing a difference between the previous frame and the frame to be transmitted.

Other compression techniques, known collectively as intraframe compression, compress data by reducing spatial redundancy within a single frame and encodes frames as data packets known as intraframes. Data packets of this type, therefore, can be decoded into frames without reference to previous frames. GOBs may be compressed using similar techniques and encoded as data packets known as inter-GOBs or intra-GOBs.

A decoder at a remote location typically decodes a data stream into a series of frames and causes the frames to be displayed on a display device, such as a computer monitor or television screen. Ideally, the frames received and displayed at the remote location are identical to the frames transmitted from the local location.

The communications channel, however, is often susceptible to various flaws that introduce errors into the data stream, such as bit errors, burst errors, and lost packets. Furthermore, equipment failures and software bugs may also corrupt the data stream. Such errors often cause visible anomalies, known as artifacts, to appear in the received frames. When anomalies appear, the received frames differ from the transmitted frames. When the data stream is corrupted, the decoder typically resynchronizes with the incoming data stream in order to receive subsequent frames properly.

One type of resynchronization technique involves finding a predefined start code that indicates the beginning of a frame or GOB or the end of a sequence of frames. The start code is typically a unique bit pattern, such as a pattern that has no other meaning in a legal data stream. After resynchronization, the decoder requests an intraframe or intra-GOB from the encoder. Due to the difficulty of detecting an error before it manifests as an illegal codeword or value, the request typically issues some time after the data stream error has occurred. Visible artifacts are usually already present in the decoded image at this point.

SUMMARY OF THE INVENTION

According to a system implementation of the present invention, a videoconferencing system transmits a data stream representing video data between first and second locations using a communications channel. The data stream contains data representing images. The videoconferencing system comprises: a data processing arrangement, configured and arranged to decode the data stream into image data, to locate a corrupted data segment in a current set of image data, and to replace the corrupted data segment with a replacement data segment generated as a function of a previous set of image data in response to an error detected in the data stream.

Another implementation of the present invention is directed to a video signal decoding arrangement for decoding a data stream into a series of images. The video signal decoding arrangement comprises: a data processing arrangement, configured and arranged to decode the data stream into image data, and to replace a corrupted data segment in a current set of image data with a replacement data segment generated as a function of a previous set of image data in response to an error detected in the data stream.

According to another implementation of the present invention, a video signal decoding arrangement for decoding a data stream comprising a series of sets of data containing start codes into a series of images is provided. The video signal decoding arrangement comprises a data processing arrangement, configured and arranged to decode the data stream into image data, to replace a corrupted data segment in a current set of image data with a replacement data segment generated as a function of a previous set of image data in response to an error detected in the data stream, and to locate a start code corresponding to a subsequent set of data.

Still another implementation of the present invention is directed to a video signal decoding arrangement for decoding a data stream comprising a series of sets of data containing delimiting codes into a series of images. The video signal decoding arrangement comprises: a video data processor, responsive to the data stream and to an error that affects the data stream such that a first set of data of the series of sets of data includes a corrupted data segment, the video data processor being configured and arranged to replace the corrupted data segment with a replacement data segment generated as a function of a second set of data of the series of sets of data; first and second frame buffers, responsive to the data processor and configured and arranged to store alternately each of the series of sets of data as an image in response to a first pointer; and a first-in-first-out buffer, configured and arranged to receive the data stream.

According to a method implementation of the present invention, an artifact concealment method for concealing artifacts in decoded video signal data is provided. The artifact concealment method comprises: detecting an error in a data stream including first and second sets of data representing images, the error affecting the second set of data such that the second set of data includes a corrupted data segment; replacing the corrupted data segment with a replacement data segment generated as a function of the first set of data, thereby generating a modified second set of data; storing the first and modified second sets of data respectively as first and second images; and locating a delimiting code corresponding to a third set of data representing an image in the data stream.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
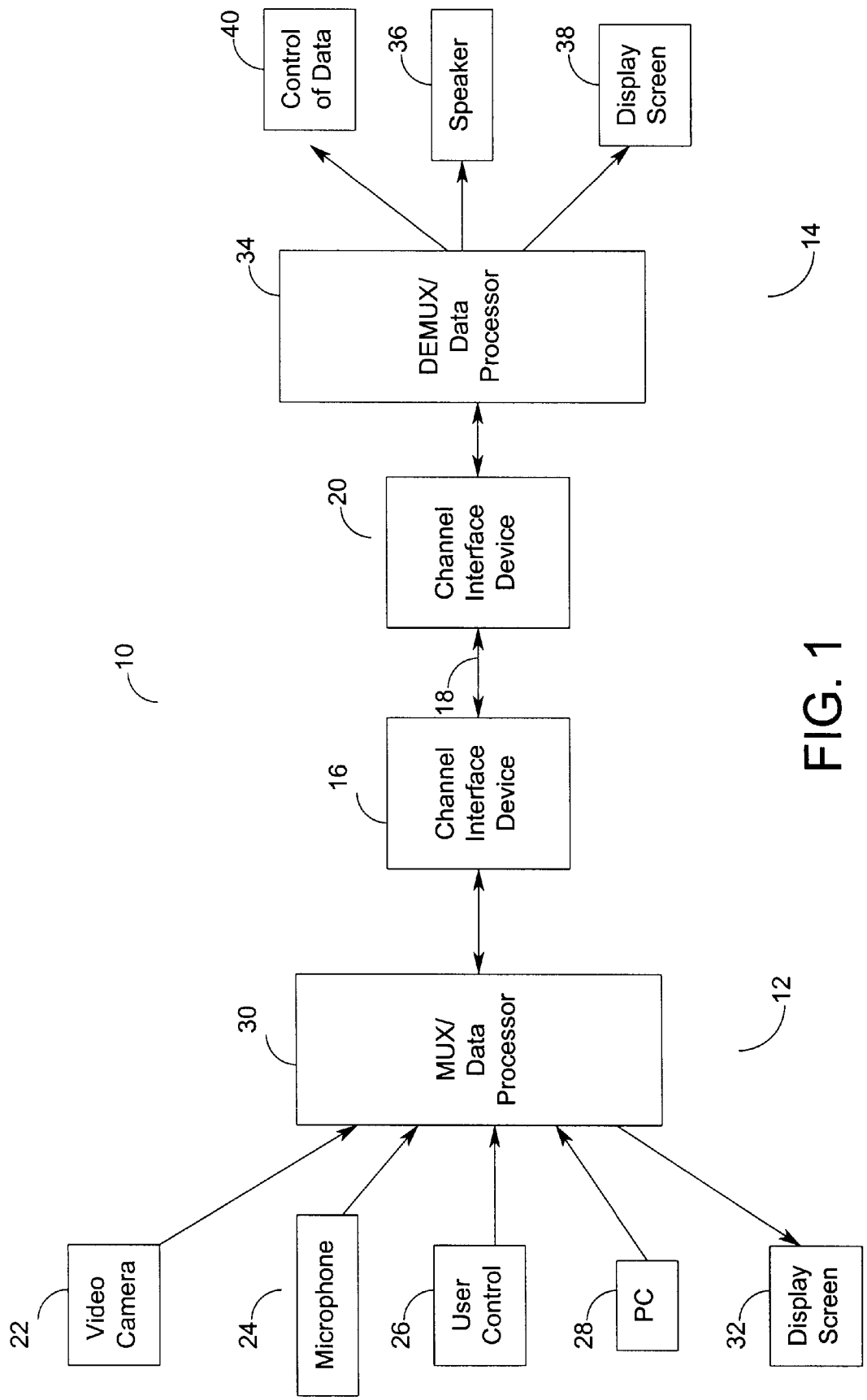
FIG. 1 is a block diagram illustrating a system implementing an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that transmit images. The invention has been found to be particularly advantageous in videoconferencing application environments in which a data stream is corrupted. An appreciation of various aspects of the invention is best gained through a discussion of various application examples operating in such a videoconferencing environment.

Turning now to the drawings, FIG. 1 illustrates a data processing system 10 for a videoconferencing application. The system includes a first station 12 and a second station 14. To facilitate the discussion below, the first and second stations 12 and 14 are respectively referred to as local and remote stations. It should be understood, however, that the features described can be incorporated into either or both stations. In the example system of FIG. 1, the local station 12 includes data sending equipment at the left-hand side of FIG. 1, and the remote station 14 includes data receiving equipment at the right-hand side of FIG. 1. It will be appreciated by those skilled in the art that the sending and receiving of such data is often reciprocal in many data processing applications of this type, with both the local station 12 and the remote station 14 including both data sending and data receiving equipment. The configuration illustrated in FIG. 1 is simplified in this regard to facilitate the discussion.

At the sending end of the system of FIG. 1, a transmitting channel interface device 16, such as a V.34-compliant modem, is used to send processed data over a communications channel 18 to a channel interface device 20 at the receiving end. For example, processed data may be sent over a telephone line, an ISDN line, an Internet channel, or a similar communications network. The data that is presented to the channel interface device 16 is collected from various types of data input sources, including, for example, a video camera 22, a microphone 24, a user control device 26, and a conventional personal computer 28. The data collected from each of these data input sources is received by multiplexer/data processing equipment (MDPE) 30. The MDPE 30 collects and formats the data collected from each of the input sources so as to maximize the amount of information transmitted over the communications channel 18. The MDPE 30 may be implemented using any of a variety of program-based circuits, e.g., a circuit based on one or more of the following: a programmable digital signal processor (DSP) chip, a general purpose processor, a reduced instruction set computer (RISC) processor, an application-specific integrated circuit (ASIC), or a combination of such circuits. In many application environments, the MDPE 30 compresses video data by reducing redundancy within the data. A display device 32 is optionally used with the video camera 22 to monitor the manner in which video images are captured by the video camera 22.

Figure 2:
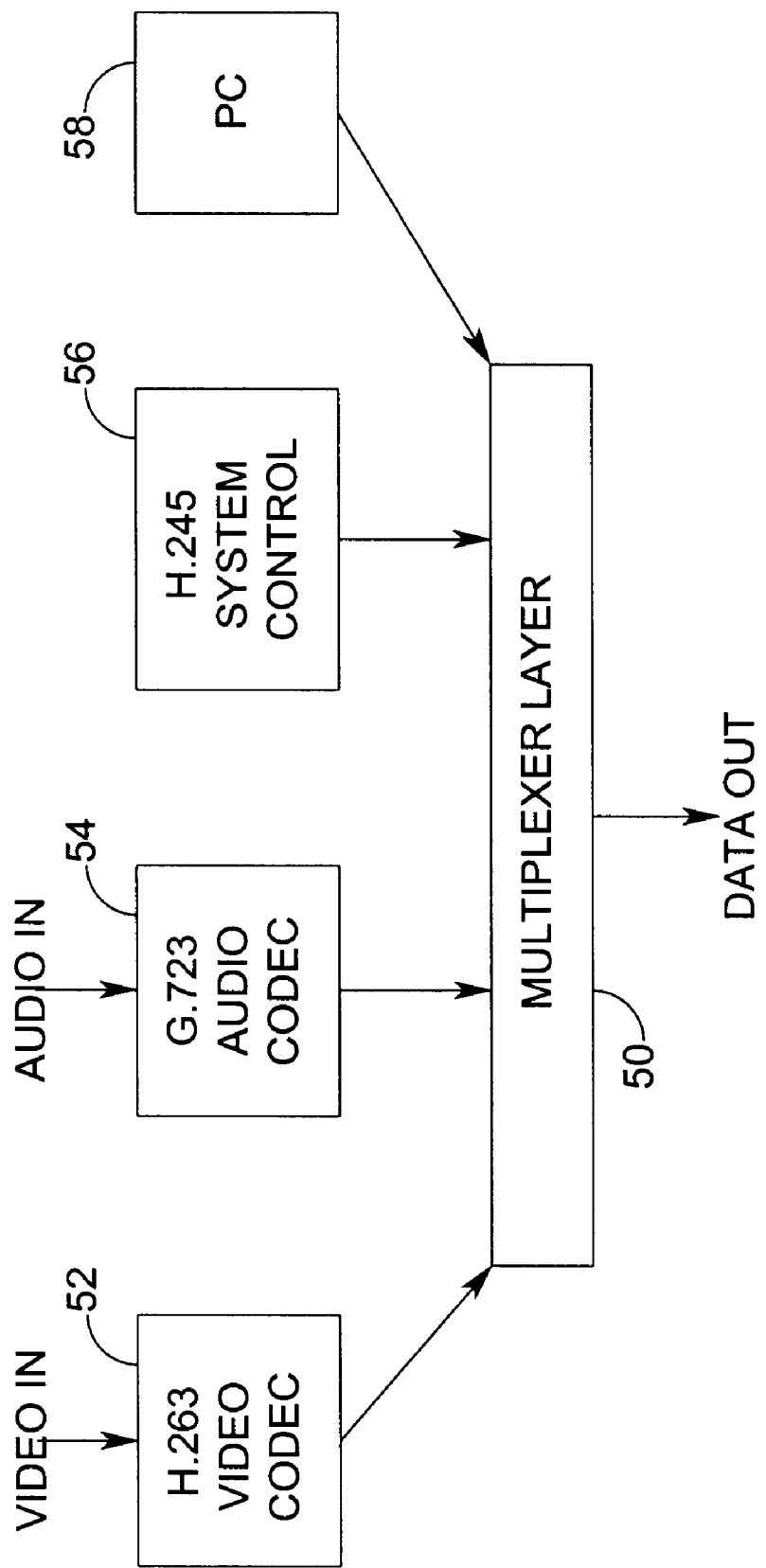
FIG. 2 is a block diagram illustrating an example arrangement implementing part of the system illustrated in FIG. 1.

FIG. 2 illustrates an example arrangement for implementing the MDPE 30. A multiplexer layer 50 receives data from several logical channels, including, for example, an H.263-compliant video coder 52, a G.723-compliant audio coder 54, an H.245-compliant system control device 56, and a conventional personal computer 58. The logical channels typically transmit data according to applicable standards. For example, the video coder 52 typically encodes video data according to the H.263 standard. The multiplexer layer 50 may be implemented using the same program-based device used to implement the MDPE 30 or a separate program-based circuit.

At the right-hand side of the system illustrated in FIG. 1, the channel interface device 20 receives the formatted information sent over the communications channel 18. The channel interface device 20 then presents the received data to demultiplexer/data processing equipment (DDPE) 34. The DDPE 34 may be implemented using the same or a separate program-based circuit. The DDPE 34 is configured to decode the formatted data received from the communications channel 18 according to instructions previously sent by the MDPE 30. In addition, the DDPE 34 is capable of sending messages, such as intraframe or intra-GOB requests, to the MDPE 30. The decoded data is then presented to the appropriate output source equipment. For example, audio data is sent to a speaker 36, video data to a display device 38, and control data to external equipment 40 for subsequent processing.

Figure 3:
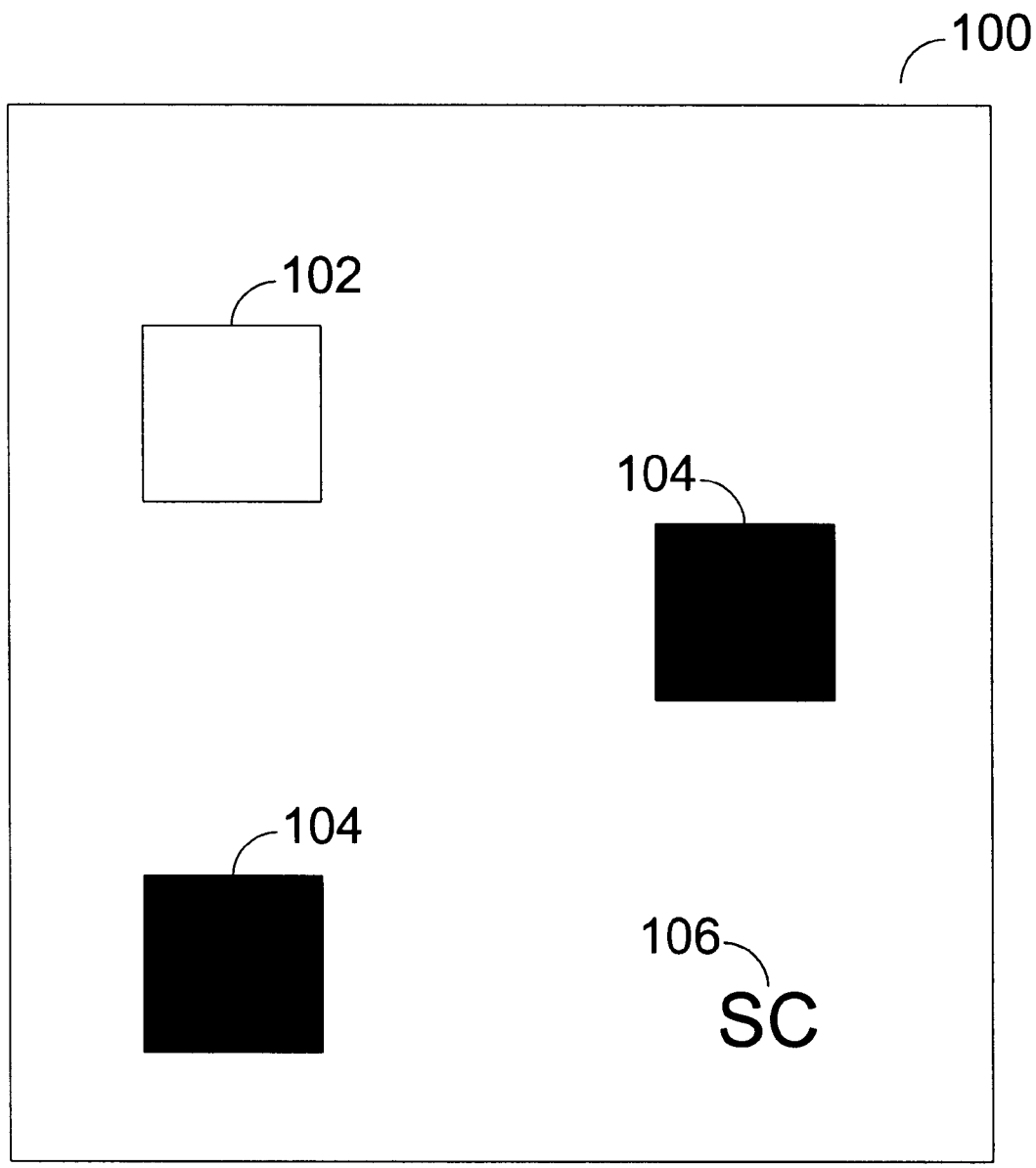
FIG. 3 illustrates an example of visible artifacts in a decoded frame resulting from a bit error in a data stream.

Data sent over the communications channel 18 often contains errors due to various imperfections affecting the communications channel 18, equipment failures, or software bugs. Such system defects may result in visible artifacts in a decoded frame. For example, FIG. 3 depicts a frame 100 that contains a single bit error at a location 102. Owing to the compressed nature of typical video data, the single bit error at the location 102 may produce artifacts at a plurality of locations 104 in the frame 100 as the frame 100 is decoded by the DDPE 34 of FIG. 1. For example, multiple artifacts from a single bit error may result if the bit error causes the DDPE 34 to lose synchronization with the incoming data stream. When the DDPE 34 loses synchronization, it may even misinterpret correct bits.

Error detection circuitry is optionally integrated into the DDPE 34 to allow it to detect errors in the received data stream using any of a variety of techniques. For example, in certain applications, the error detection circuitry determines that an error has occurred in the received data stream when it detects a start code at an unexpected location in the received data stream. In other applications, an illegal codeword indicates an error in the received data stream.

As an alternative, the error detection circuitry is integrated into the multiplexer layer 50 rather than the DDPE 34. In applications using circuit arrangements of this type, the multiplexer layer 50 transmits a signal to the DDPE 34 when a portion of the received data stream has been lost or corrupted. The multiplexer layer 50 determines that a portion of the received data stream has been lost or corrupted using any of a variety of conventional techniques, such as a technique according to the H.223 standard. According to this technique, the multiplexer layer 50 is configured to indicate to the DDPE 34 that a packet of data has been lost or corrupted. For example, the multiplexer layer 50 can specify the location of the beginning of the lost or corrupted data packet and the location of the beginning of the next valid data packet. The multiplexer layer 50 is optionally also capable of indicating the size of the lost or corrupted data packet.

When the DDPE 34 detects an error in the data stream, it resynchronizes by locating a predefined start code 106 that marks the beginning of the next frame. The start code is typically a unique bit pattern, for example, a pattern that has no other significance in a legal data stream. In many standards, the start code for the resynchronization is defined such that it will not be interpreted as image data or header information. In data streams compressed according to some standards, a sequence of bits specifying a type of start code follows the start code 106. For example, one bit sequence may indicate that the start code 106 marks the beginning of a GOB. Another bit sequence may indicate that the start code 106 marks the end of a sequence of frames.

After resynchronization, the DDPE 34 typically transmits a request for an intraframe or intra-GOB from the local station 12. In application environments in which the DDPE 34 does not detect errors in the data stream until they manifest as illegal codewords or values, artifacts appear in the decoded image 100. Additionally, the frames between the corrupted frame and the frame corresponding to the requested intraframe or intra-GOB can exhibit considerable artifacts, which can bleed into surrounding areas with each additional interframe. In the case of single bit errors, the DDPE 34 typically detects the error when a start code appears at an unexpected location within the data stream.

Figure 4:
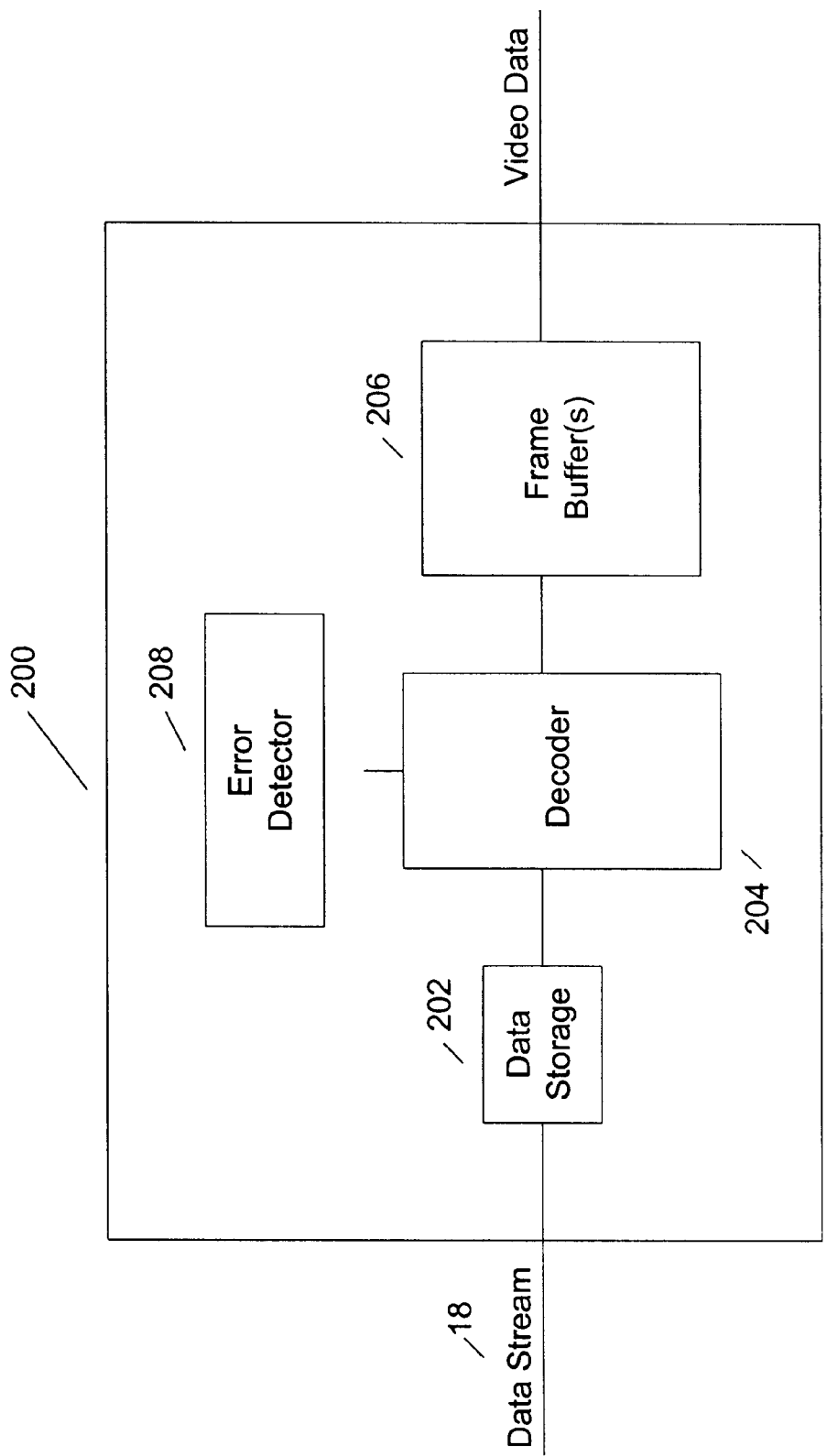
FIG. 4 is a block diagram illustrating a decoding arrangement implementing another embodiment of the present invention.

FIG. 4 illustrates one example embodiment of a decoding arrangement 200 consistent with the present invention for concealing errors in an incoming bit stream in order to reduce visible artifacts. A data stream is received from the communications channel 18 of FIG. 1 by a data storage unit 202. The data storage unit 202 may be implemented, for example, using a first-in-first-out (FIFO) buffer or a dual-access RAM. A decoder 204 reads data from the data storage unit 202 and decodes the data into video data according to a conventional standard, such as MPEG-1 or MPEG-2 compression or ITU-T H.261 or H.263. A memory 206 is configured and arranged to store the video data generated by the decoder 204. The memory 206 may be implemented, for example, using a single frame buffer partitioned to store more than one image or as two frame buffers. To facilitate the following discussion, the memory 206 is described as comprising two frame buffers. It should be understood, however, that partitions of a single frame buffer may be used.

In particular embodiments, the decoder 204 uses pointers when accessing the frame buffers. According to one such embodiment, initially, first and second pointers point respectively to first and second frame buffers. The decoder uses the first pointer to access a frame buffer for writing. The decoder uses the second pointer to access a frame buffer for outputting a stored image to a display device. As the decoder 204 decodes a newly-received frame, referred to as a current frame, it uses the first pointer to store the current frame in the first buffer. The current frame typically is not displayed before it is completely decoded. When the decoder 204 finishes decoding the current frame, the decoder begins receiving and decoding a new current frame. The decoder 204 reassigns the pointers such that the first pointer points to the second frame buffer. Accordingly, the second frame buffer stores the new current frame.

As the second frame buffer stores the new current frame, the decoder 204 accesses the first frame buffer using the second pointer. When the second pointer points to the first frame buffer, the first frame buffer sends its contents, now referred to as a previous frame, to a display device, such as a television screen or a computer monitor. After the decoder 204 has written the new current frame into the second frame buffer, the decoder 204 begins receiving another frame and again reassigns the pointers. With the first and second pointers again pointing respectively to the first and second frame buffers, the decoder stores the new frame in the first frame buffer and the display device displays the frame stored in the second frame buffer.

An error detector 208 is configured and arranged to detect errors in the data stream. Alternatively, the decoder 204 can be further configured and arranged to detect such errors. For example, a start code appearing at an unexpected location in the data stream indicates an error in the data stream. Other anomalies in the data stream, such as illegal codewords or values, may also indicate errors in the data stream. When the error detector 208 detects an error in the data stream, it commands the decoder 204 to resynchronize with the data stream. The decoder 204 resynchronizes with the data stream by finding a subsequent start code. After detecting an error, the decoder 204 optionally transmits a request for an intraframe or intra-GOB to the remote encoder.

The decoder 204 may also use a conventional double-buffering technique to conceal visible artifacts introduced before completion of resynchronization. As the decoder 204 decodes the current frame into one frame buffer, the decoder 204 localizes the error to a relatively small area within the frame, such as a GOB or a macroblock. The decoder 204 then copies data from the other frame buffer into the current frame in place of the corrupted portions of the data stream. For example, in some application environments employing intraframe compression, the data is copied from the same location in a previous frame. In some other application environments employing interframe compression, the data is predicted from, for example, previously decoded data and motion information. In addition, the decoder 204 optionally copies or predicts data from a surrounding area or the entire frame in the other frame buffer. The decoder 204 continues decoding those portions of the data stream that are not replaced by data from the other frame buffer. With these portions of the data stream being decoded as they are received rather than being copied or predicted from a previous frame, animation continues in most of the frame. Perceived image quality is thereby increased.

Figure 5:
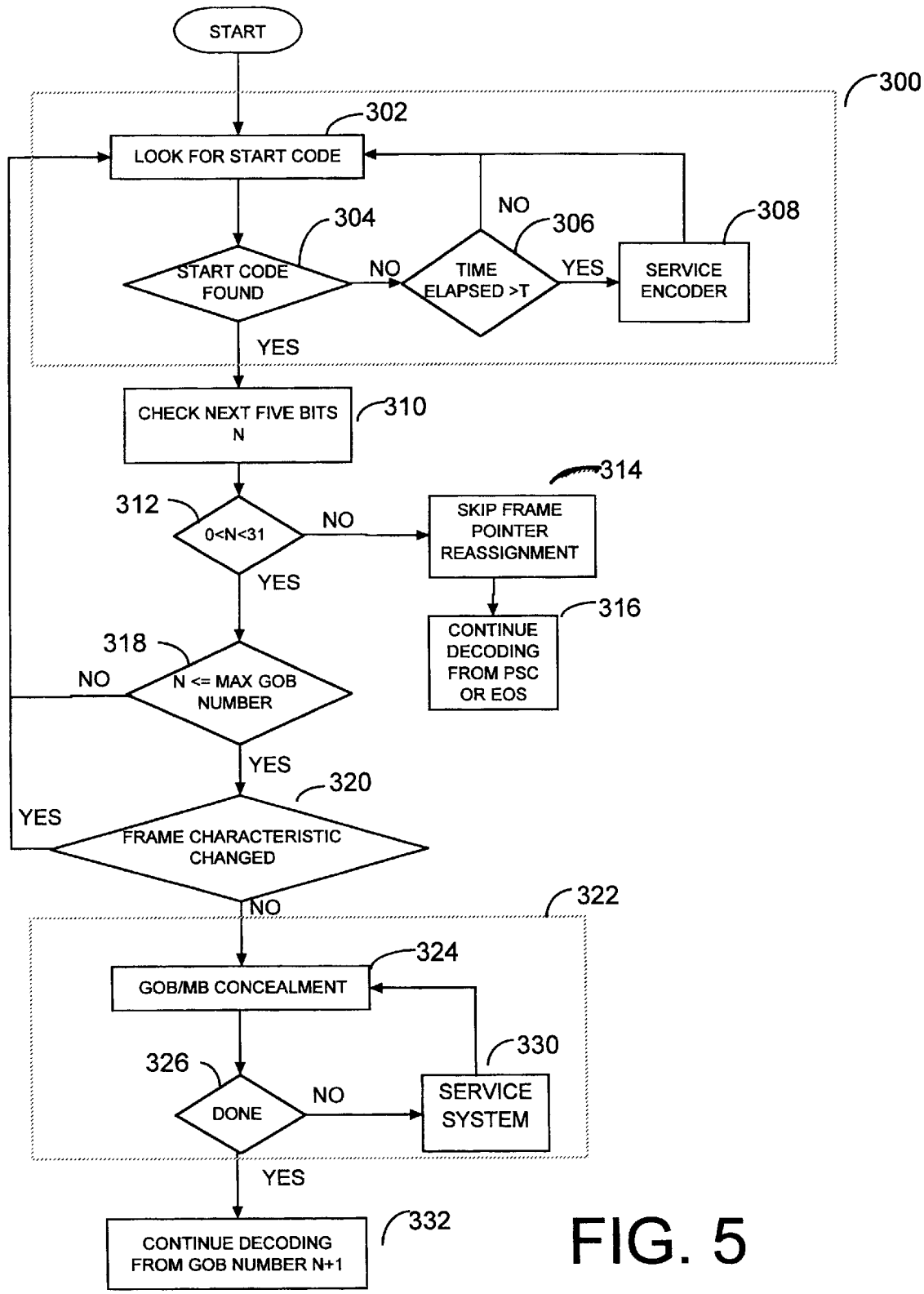
FIG. 5 is a flow chart illustrating one example implementation of the operation of the decoding arrangement illustrated in FIG. 4.

FIG. 5 illustrates one example method used by the decoder 204 of FIG. 4 to resynchronize with the data stream and conceal visible artifacts according to one embodiment of the present invention. The example method of FIG. 5 is used in connection with the H.263 standard. After an error has been detected in the data stream by the decoder 204 or by the error detector 208, the decoder 204 of FIG. 4 locates a subsequent start code, as depicted generally at a block 300. In many video compression standards, the start code is a unique bit pattern, such as a pattern that has no other meaning in a legal data stream. For example, the start code used by the H.263 standard comprises a sequence of sixteen zeros followed by a one. As depicted at blocks 302 and 304, the decoder examines a bit sequence to determine whether the bit sequence constitutes a start code. If the bit sequence does not constitute a start code, the decoder determines at a block 306 whether the time elapsed for the start code search exceeds a preselected value T. If the elapsed time exceeds T, another component of the system, such as the MDPE or the DDPE, is serviced at a block 308. Servicing another component of the system frees system resources for additional tasks, such as gathering of additional data. This process continues until the decoder 204 locates the start code.

After the decoder 204 locates the start code, flow proceeds to a block 310, at which the decoder 204 examines a number of bits immediately following the start code. For example, the H.263 standard uses the five bits following the start code to indicate a type of start code. The five bits can be considered to represent a number between 0 and 31, inclusive, that identifies the start code as, e.g., a picture start code (PSC), an end of sequence code (EOS), or a group of blocks start code (GSC). As depicted at a block 312, the decoder determines whether the number represented by the five bits is 0 or 31. If the five bits following the start code represent the number 0, the start code is a PSC. If, on the other hand, the five bits represent the number 31, the start code is an EOS. In either case, the decoder 204 omits the usual step of reassigning the pointers, as depicted at a block 314. As a result, the display device continues to display the frame stored in the previous frame buffer. In effect, the decoder 204 freezes animation on the previous frame. As depicted at a block 316, the decoder 204 then continues decoding from the PSC or EOS, writing over the corrupted current frame. Accordingly, the corrupted frame is not displayed. Pointer reassignment resumes when the decoder 204 has finished decoding the new frame.

If the number represented by the five bits following the start code is neither 0 nor 31, but a number in between 0 and 31, the start code is a GSC. The specific number represented by the five bits following the start code indicate which GOB in the frame the data segment following the start code represents. Each frame comprises no greater than a preselected maximum number of GOBs. As depicted at a block 318, the decoder 204 determines whether the number represented by the five bits following the start code exceeds this maximum number. If the number represented by the five bits is greater than the maximum number of GOBs in a frame, then the start code is invalid and flow returns to the block 300, where the decoder 204 looks for the next start code.

If the number represented by the five bits following the start code does not exceed the maximum number of GOBs in a frame, the decoder 204 then determines whether any characteristic of the frame, such as the format or size of a frame, has changed, as depicted at a block 320. If a characteristic of the frame has changed, decoding continues at the beginning of the next frame and flow returns to block 300, where the decoder 204 locates the next start code.

If the frame characteristics have not changed, the decoder 204 conceals a number of GOBs or macroblocks, as depicted generally at a block 322. As depicted at a block 324, the decoder 204 conceals a number of GOBs or macroblocks, for example, by copying corresponding GOBs or macroblocks from the frame stored in the previous frame buffer or by predicting GOBs or macroblocks from other data, such as motion vectors. In certain applications, such as applications using intraframe compression techniques, these corresponding GOBs or macroblocks are copied from the same location in the previous frame.

On the other hand, in certain other applications, the decoder 204 copies or predicts the corresponding GOBs or macroblocks from other locations in the previous frame. For example, in some applications using interframe compression techniques, the locations in the previous frame from which the decoder 204 copies the GOBs or macroblocks are determined as a function of motion vectors or other difference information. In order to conceal undetected errors, the decoder 204 optionally conceals a number of surrounding GOBs or macroblocks in addition to the corrupted GOB or macroblock itself.

Figure 6:
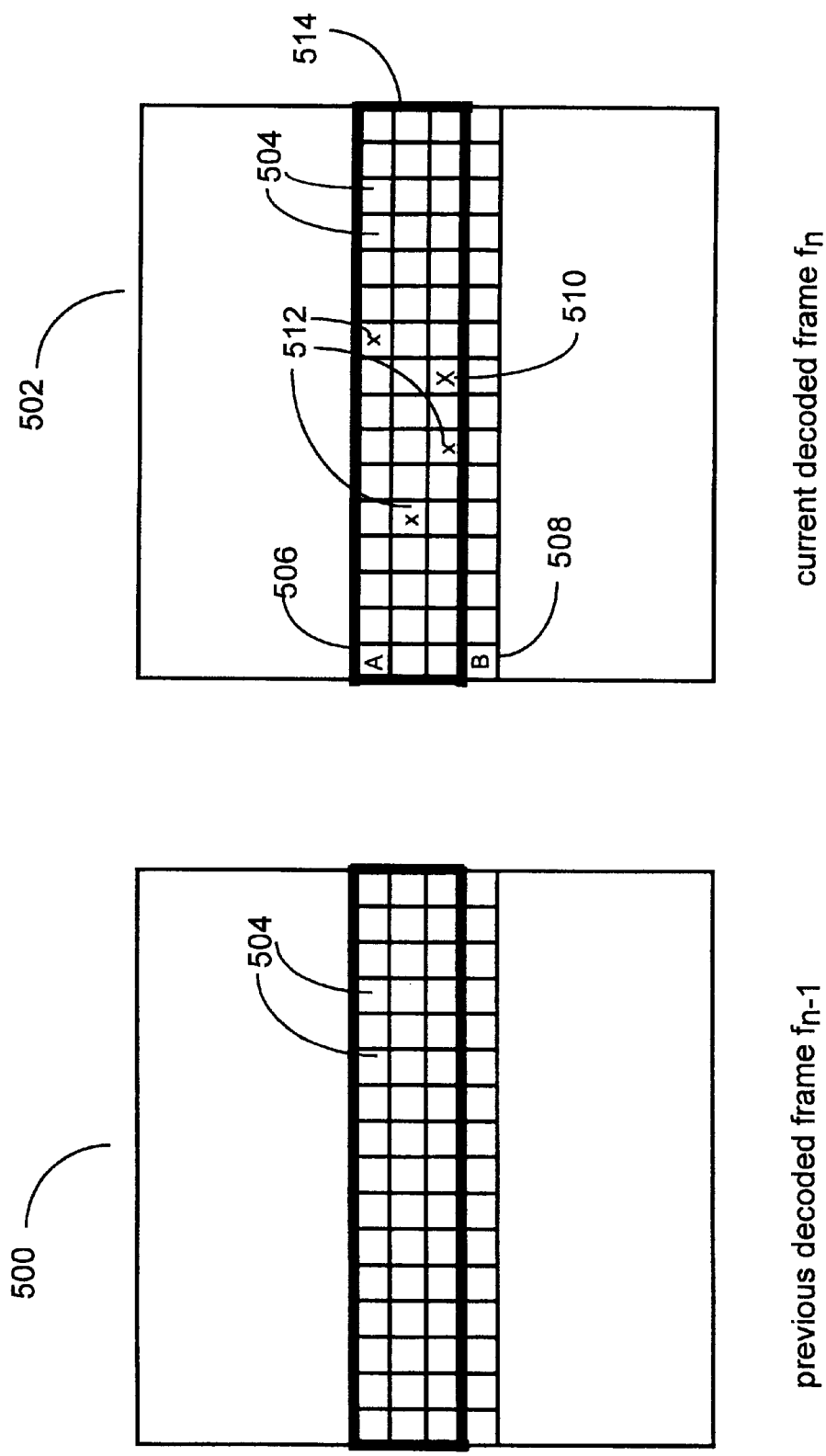
FIG. 6 is a diagram illustrating an example of data segment replacement according to the present invention.

One example of macroblock concealment is illustrated in FIG. 6. FIG. 6 illustrates a previous decoded frame 500 and a current decoded frame 502, each of which comprises a set of macroblocks 504. It should be understood that, while individual macroblocks are illustrated for portions of the frames 500 and 502 to simplify the diagram, the entirety of each of the frames 500 and 502 comprises a set of macroblocks 504. Two of the macroblocks 504, depicted at reference numerals 506 and 508, begin respectively with start codes A and B. The start code A occurs at an expected location; i.e., the decoder 204 expects the macroblock 506 to contain a start code. In the example illustrated in FIG. 6, the decoder 204 detects an error at a macroblock 510, for example, by finding an unexpected start code. Accordingly, the decoder 204 resynchronizes to the start code B. The decoder 204, however, fails to detect a number of errors occurring at a number of macroblocks 512.

In the illustrated example, the decoder 204 conceals, in addition to the detected corrupted macroblock 510, a surrounding strip of a size selected as a function of, for example, the spacing between consecutive start codes in the data stream. In particular, the beginning of the strip to be concealed may be defined as the preceding start code. The strip size may also be selected as a function of, for example, an assessment of the susceptibility of the communications channel 18 to anomalies. In the illustrated example, the decoder 204 conceals a strip 514 denoted by the bold lines on FIG. 6. Because single bit errors often introduce multiple artifacts, this technique effectively conceals a relatively large number of undetected errors while avoiding freezing animation on an entire frame.

Referring again to FIG. 5, after the decoder 204 conceals the GOBs or macroblocks, flow proceeds to a block 326, at which the decoder 204 determines whether concealment has been completed. If concealment has not been completed, another part of the system is serviced, as depicted at a block 330. After concealment has been completed, flow proceeds to a block 332, where the decoder 204 continues to decode the current frame from the next GOB. While animation on the corrupted GOB is suspended until the next frame is decoded, animation continues for the remainder of the frame, resulting in improved image quality.

While the example method of FIG. 5 is described above in the example context of the H.263 standard, it should be understood that the technique can be modified for use in other application environments without departing from the scope of the invention. For example, certain video compression standards use a different number of bits to identify the start code type.

As discussed above, the occurrence of a start code at an unexpected location caused by a previous error often triggers the error-detection mechanism. Although the start code and the following data may be free of errors, resynchronization may be delayed by a few GOBs to an entire frame, e.g., if the decoder 204 of FIG. 4 locates the next start code, rather than using the start code that triggered the error-detection mechanism. In addition to delaying resynchronization, missing this start code also reduces the effectiveness of artifact concealment.

One aspect of the present invention avoids missing this start code by maintaining a running count of consecutive zeros in the data stream, e.g., using a concurrently-running zero counter. The zero counter resets when a one occurs in the data stream. If the zero counter indicates that the error detector may have triggered within a start code, the decoder 204 continues searching for the remainder of the start code. If the decoder 204 finds the remainder of the start code, resynchronization begins at that start code.

The method illustrated in FIG. 5 may use any of a variety of approaches for locating start codes. For example, in certain application environments, dedicated hardware components are used to locate start codes. In certain other application environments, software techniques may realize greater search efficiency. For example, a software technique that could be used involves deciding whether to complete the search for a start code after a certain location in the data stream based on an analysis of the likelihood of the location occurring within a start code as informed by the zero counter.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. A video signal decoding arrangement for decoding a data stream into a series of images, the video signal decoding arrangement comprising
   a data processing arrangement, configured and arranged to:
      decode the data stream into a plurality of sets of image data,
      identify a corrupted data segment in a current set of image data, and
      replace the corrupted data segment with a replacement data segment generated as a function of a previous set of image data in response to an error detected in the data stream, wherein the data processor selectively stores the current set of image data in a first memory or a second memory based on a first pointer.

2. A video signal decoding arrangement for decoding a data stream into a series of images, according to claim 1, wherein at least one of the first and second memories comprises a frame buffer.

3. A video signal decoding arrangement for decoding a data stream into a series of images, according to claim 2, further comprising a display device, responsive to the data processing arrangement and to the first and second memories and configured and arranged to selectively display an image stored in the first memory or the image stored in the second memory, based on a second pointer.

4. A video signal decoding arrangement for decoding a data stream into a series of images, according to claim 3, wherein the first pointer points to one of the first and second memories and the second pointer points to another of the first and second memories.

5. A video signal decoding arrangement for decoding a data stream into a series of images, according to claim 4, wherein the data processing arrangement reassigns the first and second pointers upon receiving one of the plurality of sets of data, such that the first pointer points alternately to the first memory or the second memory.

6. A video signal decoding arrangement for decoding a data stream into a series of images, according to claim 5, wherein the data processing arrangement omits reassigning the first and second pointers in response to the error.

7. A video signal decoding arrangement for decoding a data stream into a series of images, comprising:
   a data processing arrangement, configured and arranged to:
      decode the data stream into a plurality of sets of image data,
      identify a corrupted data segment in a current set of image data, and
      replace the corrupted data segment with a replacement data segment generated as a function of a previous set of image data in response to an error detected in the data stream;
   an error detecting arrangement, configured and arranged to detect the error in the data stream and to provide an indication of characteristics of the error to the data processing arrangement; and
   a prediction arrangement, responsive to the error detecting arrangement and configured and arranged to determine a likelihood that the error detecting arrangement triggered within a delimiting code.

8. A video signal decoding arrangement for decoding a data stream comprising a series of sets of data containing delimiting codes into a series of images, the video signal decoding arrangement comprising:
   a video data processor, responsive to the data stream and to an error that affects the data stream such that a first set of data of the series of sets of data includes a corrupted data segment, the video data processor being configured and arranged to replace the corrupted data segment with a replacement data segment generated as a function of a second set of data of the series of sets of data;
   first and second frame buffers, responsive to the data processor and configured and arranged to store alternately each of the series of sets of data as an image in response to a first pointer; and a first-in-first-out buffer, configured and arranged to receive the data stream.

9. A video signal decoding arrangement for decoding a data stream comprising a series of sets of data containing delimiting codes into a series of images, according to claim 8, wherein the series of sets of data comprises at least one of the following: a series of macroblocks, a series of groups of blocks, and a series of frames.

10. A video signal decoding arrangement for decoding a data stream comprising a series of sets of data containing delimiting codes into a series of images, according to claim 8, wherein the video data processor includes at least one of the following: a programmable digital signal processor (DSP) chip, a general purpose processor, a reduced instruction set computer (RISC) processor, and an application-specific integrated circuit (ASIC).

11. A video signal decoding arrangement for decoding a data stream comprising a series of sets of data containing delimiting codes into a series of images, according to claim 8, wherein the data segment that is replaced includes a starting location determined as a function of the delimiting code corresponding to a previous set of data of the series of sets of data.

12. A video signal decoding arrangement for decoding a data stream comprising a series of sets of data containing delimiting codes into a series of images, according to claim 8, wherein the replacement data segment is copied from the second set of data.

13. A video signal decoding arrangement for decoding a data stream comprising a series of sets of data containing delimiting codes into a series of images, according to claim 8, further comprising an error detecting arrangement, configured and arranged to detect the error in the data stream and to provide an indication of characteristics of the error to the video data processor.

14. A video signal decoding arrangement for decoding a data stream into a series of images, according to claim 13, wherein the error detecting arrangement comprises a multiplexing arrangement.

15. A video signal decoding arrangement for decoding a data stream into a series of images, according to claim 13, further comprising a prediction arrangement, responsive to the error detecting arrangement and configured and arranged to determine a likelihood that the error detecting arrangement triggered within a delimiting code.

16. A video signal decoding arrangement for decoding a data stream comprising a series of sets of data containing delimiting codes into a series of images, according to claim 8, further comprising a display device, responsive to the video data processor and to the first and second frame buffers and configured and arranged to selectively display the image stored in the first frame buffer or the image stored in the second frame buffer in response to a second pointer.

17. A video signal decoding arrangement for decoding a data stream comprising a series of sets of data containing delimiting codes into a series of images, according to claim 16, wherein the first pointer points to one of the first and second frame buffers and the second pointer points to another of the first and second frame buffers.

18. A video signal decoding arrangement for decoding a data stream comprising a series of sets of data containing delimiting codes into a series of images, according to claim 17, wherein the video data processor reassigns the first and second pointers upon receiving one of the series of sets of data, such that the first pointer points alternately to the first frame buffer or the second frame buffer.

19. A video signal decoding arrangement for decoding a data stream comprising a series of sets of data containing delimiting codes into a series of images, according to claim 18, wherein the video data processor omits reassigning the first and second pointers in response to an error in the data stream.

20. An artifact concealment method for concealing artifacts in decoded video signal data, the artifact concealment method comprising:
    detecting an error in a data stream including first and second sets of data representing images, the error affecting the second set of data such that the second set of data includes a corrupted data segment;
    replacing the corrupted data segment with a replacement data segment generated as a function of the first set of data, thereby generating a modified second set of data;
    storing the first and modified second sets of data as first and second images; and
    locating a delimiting code corresponding to a third set of data representing an image in the data stream.

21. An artifact concealment method for concealing artifacts in decoded video signal data, according to claim 20, further comprising storing the first and second images in a memory.

22. An artifact concealment method for concealing artifacts in decoded video signal data, according to claim 20, wherein the delimiting code comprises a start code.

23. An artifact concealment method for concealing artifacts in decoded video segment data, according to claim 20, further comprising copying the replacement data segment from the first set of data.

24. An artifact concealment method for concealing artifacts in decoded video segment data, according to claim 20, further comprising:
    using a multiplexing arrangement to detect the error in the data stream; and
    providing an indication of characteristics of the error.

25. An artifact concealment method for concealing artifacts in decoded video signal data, according to claim 20, further comprising
    selectively storing the first and second images in first and second memories in response to a first pointer, and
    selectively displaying the image stored in the first memory or the image stored in the second memory in response to a second pointer.

26. An artifact concealment method for concealing artifacts in decoded video signal data, according to claim 25, wherein the first pointer points to one of the first and second memories and the second pointer points to another of the first and second memories.

27. An artifact concealment method for concealing artifacts in decoded video signal data, according to claim 26, further comprising reassigning the first and second pointers in response to receiving a subsequent set of data in the data stream, such that the first pointer points alternately to the first memory or the second memory.

28. An artifact concealment method for concealing artifacts in decoded video signal data, according to claim 27, further comprising omitting the step of reassigning the first and second pointers in response to an error in the data stream.

29. A video signal processing arrangement for decoding a data stream into a series of images, the video signal processing arrangement comprising:
    an error detecting arrangement configured and arranged to detect an error in the data stream and to output an indication of the error;
    a memory arranged to store a current image and a previous image;

a video decoder adapted to respond to the data stream and to the previous image and to generate the current image from the data stream and from a prediction based on the previous image; and an error concealment arrangement, responsive to the indication output by the error detecting arrangement, adapted and configured to identify a corrupt segment of the current image and replace the corrupt segment with a replacement segment generated as a function of the previous image.

30. A video signal processing arrangement for decoding a data stream into a series of images, according to claim 29, wherein the error detecting arrangement comprises a demultiplexing arrangement.

31. A video signal processing arrangement for decoding a data stream into a series of images, according to claim 29, wherein the error concealment arrangement is adapted to copy the replacement segment from the previous image to the current image.

32. A video signal processing arrangement for decoding a data stream into a series of images, according to claim 29, wherein the error concealment arrangement is adapted to predict the replacement segment from the previous image and from motion information.

33. A video signal processing arrangement for decoding a data stream into a series of images, according to claim 29, wherein the video decoder is adapted to receive an error indication from the error detecting arrangement and subsequently resynchronize with the data stream by locating the next start code.

34. A video signal processing arrangement for decoding a data stream into a series of images, according to claim 29, wherein the error detecting arrangement is implemented as part of the video decoder.

35. A video signal processing arrangement for decoding a data stream into a series of images, according to claim 34, wherein the error detecting arrangement is adapted to detect an error by identifying illegal codewords in the data stream.

36. A video signal processing arrangement for decoding a data stream into a series of images, according to claim 34, wherein the error detecting arrangement is adapted to detect an error by identifying a misplaced start code in the data stream.

37. A video signal processing arrangement for decoding a data stream into a series of images, according to claim 36, wherein the video decoder is adapted to maintain a running count of consecutive zeros in the data stream in order to identify a misplaced start code.

38. A video signal processing arrangement for decoding a data stream into a series of images, comprising:

error detecting means for detecting an error in the data stream and to output an indication of the error;

a memory arranged to store a current image and a previous image;

video means, responsive to the data stream and to the previous image, for generating the current image from the data stream and from a prediction based on the previous image; and error concealment means, responsive to the indication output by the error detecting means for identifying a corrupt segment of the current image and replace the corrupt segment with a replacing segment generated as a function of the previous image.

39. A video signal processing method for decoding a data stream into a series of images, comprising:

detecting an error in the data stream and to output an indication of the error;

storing a current image;

storing a previous image;

responsive to the data stream and to the previous image, generating the current image from the data stream and from a prediction based on the previous image; and responsive to the indication of the error, identifying a corrupt segment of the current image and replace the corrupt segment with a replacing segment generated as a function of the previous image.

* * * * *

UNITED STATES PATENT AND TRADEMARK OFFICE
CERTIFICATE OF CORRECTION

PATENT NO. : 5,910,827 Page 1 of 1
DATED : June 8, 1999
INVENTOR(S) : Kwan et al.

It is certified that error appears in the above-identified patent and that said Letters Patent is hereby corrected as shown below:

Column 1,
Lines 41 and 48, "encodes" should read -- encode --.

Column 11,
Line 37, "multiplexing" should read -- demultiplexing --.

Column 12,
Line 32, "multiplexing" should read -- demultiplexing --.

Signed and Sealed this

Twenty-sixth Day of July, 2005

JON W. DUDAS
*Director of the United States Patent and Trademark Office*